(No Model.)

J. N. COCKER.
POTATO HARVESTER.

No. 463,098. Patented Nov. 10, 1891.

3 Sheets—Sheet 3.

Witnesses:
J. A. Rutherford
Robert Emmett

Inventor:
Joseph N. Cocker,
By James L. Norris,
Attorney

THE NORRIS PETERS CO., PHOTO-LITHO., WASHINGTON, D. C.

UNITED STATES PATENT OFFICE.

JOSEPH N. COCKER, OF WEST DEVONPORT, TASMANIA.

POTATO-HARVESTER.

SPECIFICATION forming part of Letters Patent No. 463,098, dated November 10, 1891.

Application filed May 29, 1891. Serial No. 394,593. (No model.) Patented in England December 15, 1890, No. 20,443; in France May 26, 1891, No. 213,708, and in Belgium May 26, 1891, No. 95,008.

*To all whom it may concern:*

Be it known that I, JOSEPH NORTH COCKER, a subject of the Queen of Great Britain, residing at West Devonport, in the Colony of Tasmania, have invented a new and useful Improved Potato-Harvester, (for which I have obtained Letters Patent in France May 26, 1891, No. 213,708; in Belgium May 26, 1891, No. 95,008, and Great Britain by application No. 20,443, which patent, when granted, will bear date December 15, 1890,) of which the following is a specification.

This invention has been devised for the purpose of providing a machine which will raise potatoes from the ground, clean them, and deposit them in bags or elsewhere without bruising or otherwise injuring them and without requiring the expenditure of so much time and labor as has hitherto been necessary.

The essential feature of this improved potato-harvester consists in the employment of a large elevator-wheel, having projecting vanes or blades, arranged to work inside a fixed screen of bars, extending about a third round its circumference. This elevator-wheel is driven by rolling along the ground and serves to carry the potatoes, turned into the fixed screen by a plowshare, to the upper end of the screen, where they are delivered onto an inclined inner screen, leading them by a lateral chute to a trough, where they are from time to time discharged. The soil which falls through this inner screen is directed by another inclined chute to the ground at the side of the machine.

Figure 1:
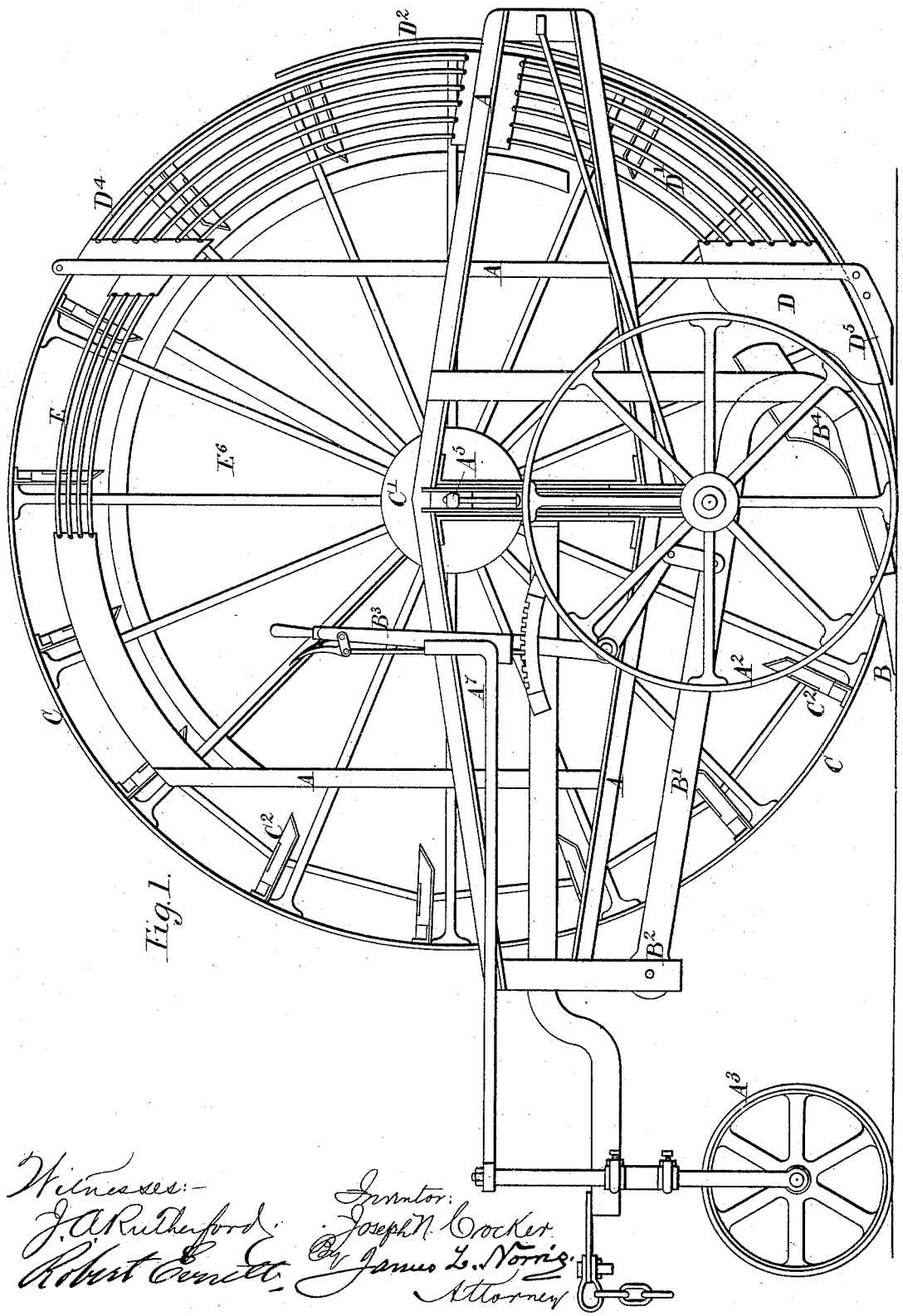
Figure 2:
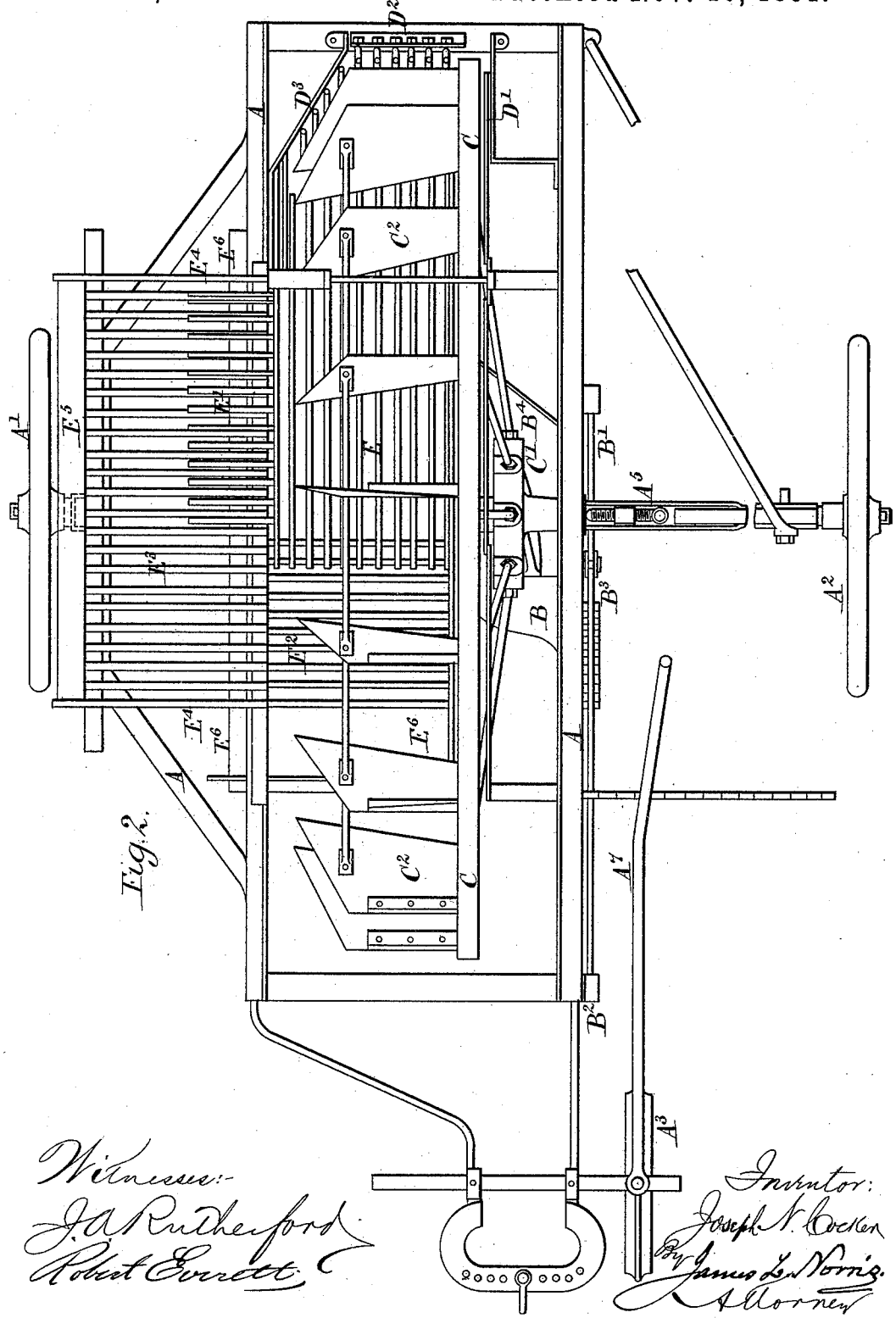
Figure 3:
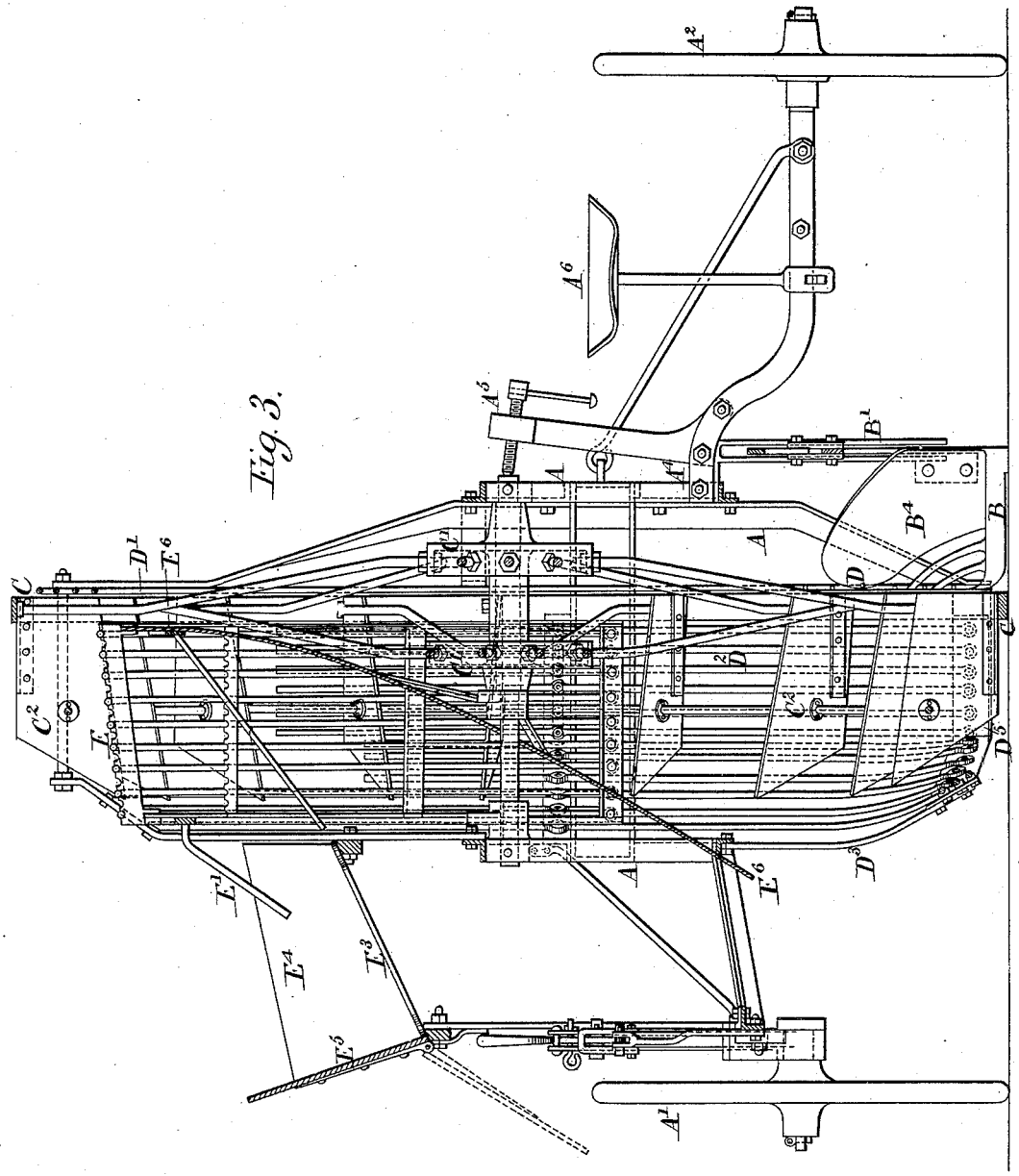

Figure 1 of the accompanying drawings is a side view, Fig. 2 is a plan, and Fig. 3 is a vertical section taken in front of the axle of the elevator-wheel, looking from the front, of a potato-harvester according to my invention.

A framing A, which is preferably made of angle or T iron, is carried upon three wheels $A'$ $A^2$ $A^3$. The axletree of the wheel $A^2$ is pivoted at $A^4$ to the framing, and can be adjusted by a screw $A^5$, worked by the driver, who occupies a seat $A^6$, and who, by means of a lever $A^7$, can steer the front wheel $A^3$. A share B, carried on an arm $B'$, pivoted to the frame at $B^2$, can be lowered or raised by a lever $B^3$, so as to penetrate more or less deeply into the ground. The rim C of the elevator-wheel, which is carried by spokes from bosses $C'$ revolving on a fixed axletree, supported by the framing A, rolls along at the side of the furrow formed by the share B, which has its back portion $B^4$ formed as a curved mold-board, which guides the plowed-up mold and roots onto a grating of bars, forming a cage inclosing part of the circumference of the wheel C and a number of obliquely-set blades $C^2$ carried by the wheel. The grated cage consists of a set of bars $D'$, attached to a plate D on the one side of the wheel, a set of bars $D^2$, outside its circumference, having their lower ends attached to a plate $D^5$, and a set of bars $D^3$ occupying an oblique position on the other side of the wheel. These gratings extend up from the share B to $D^4$, inclosing about one-third of the circumference of the wheel. At about the height where the gratings inclosing the outside of the wheel terminate another set of grating-bars E are arranged parallel to the plane of revolution, but on an inclination toward the farther side. Beyond them are a set of inclined bars $E'$ at right angles to the former, and farther round another set of bars $E^2$, all these forming a grated platform within the circumference in which the blades $C^2$ revolve, all inclined down toward an outer inclined grating $E^3$, forming the bottom of a trough, having two sides $E^4$ and a hinged front $E^5$. To the one side of and under the gratings E $E'$ $E^2$ is fixed a curved plate $E^6$. The bars of the gratings $D'$ $D^2$ $D^3$ and of E, $E'$, $E^2$, and $E^3$ are placed at such distances apart as to let soil freely through between them, but not potatoes, and these intervals may be made adjustable to suit different soils or crops.

The machine operates in the following manner: The soil and roots plowed up by the share B are guided by its curved back $B^4$ onto lower part of the cage, formed by the gratings $D'$ $D^2$ $D^3$. Here they are caught by the blades $C^2$ and carried up along the gratings, much of the soil escaping through the interstices of the bars. As the blades $C^2$ pass above the level of the axis of the wheel, they begin to incline inward, delivering the roots and such soil as remains with them onto the platform, consisting of the bars E $E'$ $E^2$, whence they slide or fall onto the platform $E^3$. The soil, now almost entirely separated from the roots, falling through between the bars, drops onto the curved plate $E^6$, by which it is guided away to the ground at the side of the machine. When the trough $E^3$ $E^4$ $E^5$ is sufficiently filled, the door $E^5$ is turned down on its hinges, as indicated by the dotted lines, delivering the potatoes onto the ground or into trucks or receptacles provided to receive them. In some cases it is of advantage to arrange another plowshare in front of the rim C, especially when the ground is stony, in order to clear the way and form a path for the wheel.

Having thus described the nature of my invention, and the best means of carrying the same into practical effect, I claim—

In a potato-harvester, the combination of a frame carried on two side wheels, and a steering-wheel, an elevator-wheel carried on the frame and having inwardly-projecting blades, a share-plow, provided with mold-board gratings, inclosing three sides of the elevator-wheel over part of its circumference, and along which mold-board gratings the potatoes are moved upward by the action of the inwardly-projecting blades of the elevator-wheel, and a grated platform inclined to one side within the upper part of the path of the wheel-blades, all arranged and operating substantially as described.

In testimony whereof I have signed my name to this specification, in the presence of two subscribing witnesses, this 6th day of May, A. D. 1891.

JOSEPH N. COCKER.

Witnesses:
  OLIVER IMRAY,
*Patent Agent, 28 Southampton Buildings, London, W. C.*
  JNO. P. M. MILLARD,
*Clerk to Messrs. Abel & Imray, Consulting Engineers and Patent Agents, 28 Southampton Buildings, London, W. C.*